(12) United States Patent
Reddy

(10) Patent No.: US 6,809,445 B2
(45) Date of Patent: Oct. 26, 2004

(54) METHOD AND APPARATUS FOR ELECTRIC MOTOR LEAD WIRE RETENTION

(75) Inventor: Gaddam Reddy, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 132 days.

(21) Appl. No.: 10/116,313

(22) Filed: Apr. 4, 2002

(65) Prior Publication Data

US 2003/0189381 A1 Oct. 9, 2003

(51) Int. Cl.⁷ .................................................. H02K 5/00
(52) U.S. Cl. ........................................ 310/89; 310/71
(58) Field of Search ............................... 310/71, 89, 87

(56) References Cited

U.S. PATENT DOCUMENTS

| | | | |
|---|---|---|---|
| 3,207,837 A | * | 9/1965 | Brezosky .................. 174/65 R |
| 3,499,097 A | * | 3/1970 | Widstrand ................. 174/65 G |
| 3,502,917 A | * | 3/1970 | Bizoe ........................... 310/71 |
| 3,978,548 A | | 9/1976 | Canney ........................ 16/109 |
| 4,437,027 A | * | 3/1984 | Yamamoto et al. ........... 310/78 |
| 4,473,764 A | * | 9/1984 | White ........................ 310/91 |
| 4,523,117 A | * | 6/1985 | Daniels ....................... 310/71 |
| 4,904,893 A | | 2/1990 | Snider et al. ............... 310/260 |
| 4,926,013 A | | 5/1990 | Kodama ................. 200/19 DC |
| 4,984,973 A | | 1/1991 | Itameri-Kinter et al. .... 417/422 |
| 5,600,294 A | | 2/1997 | Buenconsejo et al. ...... 336/192 |
| 5,767,596 A | * | 6/1998 | Stark et al. .................. 310/89 |
| 5,798,625 A | * | 8/1998 | Tanii et al. ................. 318/541 |
| 5,861,691 A | | 1/1999 | Soh et al. ..................... 310/89 |

\* cited by examiner

Primary Examiner—Dang Le
(74) Attorney, Agent, or Firm—Armstrong Teasdale LLP

(57) ABSTRACT

A cover for an electric motor including at least one lead wire. The cover includes an inner face, an outer face, and at least one opening extending therebetween. The opening is defined by a perimeter including at least one groove extending between the inner face and the outer face.

35 Claims, 6 Drawing Sheets

METHOD AND APPARATUS FOR ELECTRIC MOTOR LEAD WIRE RETENTION

BACKGROUND OF THE INVENTION

This invention relates generally to electric motors and more particularly to electric motor lead wires.

At least some known electric motors include a slot in the cover of the motor that enables lead wires coupled to the motor inside the cover to extend through the motor cover to couple to an electrical power source. Typically, the motor cover also includes a rubber or plastic lead grommet positioned in the slot and including a plurality of holes for receiving the lead wires. The lead grommet insulates the lead wires from the metal surfaces of the motor cover and facilitates sealing the inside of the motor from water and other contaminants. The lead grommet also adds an additional part to electric motors, which may increase the overall cost of the motor, and the time and expense required to assemble the motor.

BRIEF SUMMARY OF THE INVENTION

In one aspect, a cover is provided for an electric motor including at least one lead wire. The cover includes an inner face, an outer face, and at least one opening extending therebetween. The opening is defined by a perimeter including at least one groove extending between the inner face and the outer face.

In another aspect, a can is provided for an electric motor including at least one lead wire. The can includes an inner face, an outer face, and at least one opening extending therebetween. The opening is defined by a perimeter including at least one groove extending between the inner face and the outer face. The can is configured to couple with an electric motor cover.

In a further aspect, an electric motor is provided that includes a housing having a cover and a can. The cover is fixedly coupled to the can. The housing includes an inner face, an outer face, and at least one opening extending therebetween. The opening is defined by a perimeter including at least one groove extending between the inner face and the outer face. The motor also includes a stator having at least one winding and a bore therethrough. The stator is mounted in the motor housing. At least one lead wire is electrically coupled with the at least one winding and is configured for electrical connection with an electrical power source. A rotor shaft extends at least partially through the bore and the housing. A rotor core is mounted on the rotor shaft and includes at least one magnet.

In yet another aspect, a method is provided for insulating an electric motor. The electric motor includes a cover, a can, and at least one lead wire having insulation surrounding the at least one lead wire. The method includes inserting the at least one lead wire between the cover and the can and compressing the insulation between the cover and the can.

DETAILED DESCRIPTION OF THE INVENTION

Figure 1:
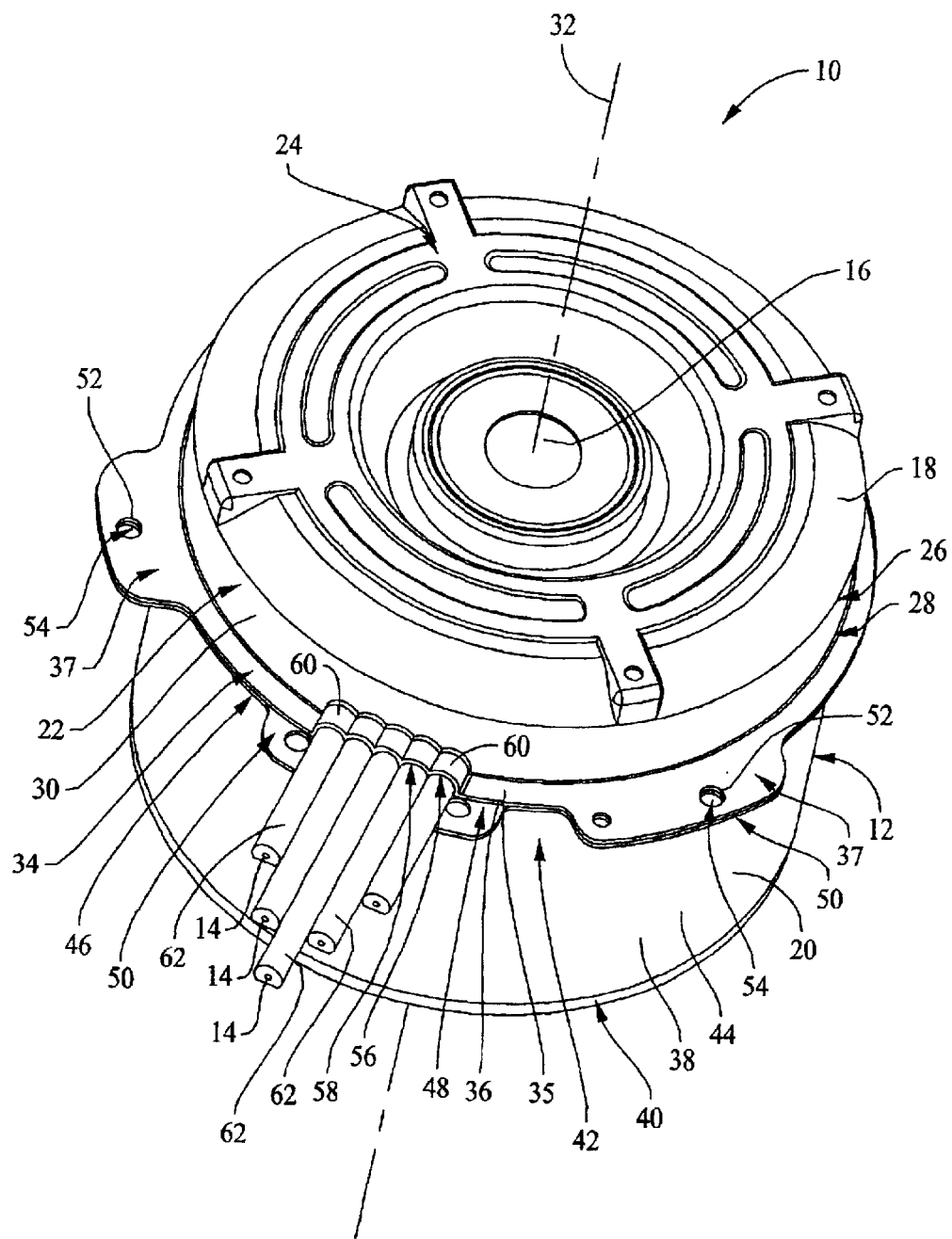
FIG. 1 is a perspective view of one embodiment of an electric motor of the present invention.

FIG. 1 is a perspective view of one embodiment of an electric motor 10. In one embodiment, motor 10 is a #29 frame motor commercially available from the General Electric Industrial Systems business of General Electric Company, Louisville, Ky. Motor 10 includes a housing 12, a stator (not shown), a rotor core (not shown), a rotor shaft (not shown), and at least one lead wire 14. More specifically, in the exemplary embodiment, motor 10 includes a plurality of lead wires 14. The stator is mounted within housing 12 and includes a stator bore (not shown) extending therethrough and at least one winding (not shown). Lead wires 14 are electrically coupled with the motor windings. The rotor shaft extends at least partially through the stator bore and through a circular opening, or hole, 16 in housing 12.

Housing 12 includes a cover, also referred to as an endshield or a cap, 18 and a can 20. Cover 18 includes opening 16, a first wall 22, and a second wall 24. First wall 22 is generally cylindrical and includes a first end 26, a second end 28, an inner face (not shown), and an outer face 30. In an alternative embodiment, first wall 22 is not generally cylindrical, and may be any appropriate shape allowing normal operation of motor 10. Second wall 24 extends radially inward from first end 26 of first wall 22 toward a central axis 32 of motor 10. In one embodiment, second wall 24 extends substantially perpendicularly to first wall 22 towards central axis 32. Cover 18 also includes a cover flange 34 including a top surface 35 and a bottom surface 36. Cover flange 34 extends radially outward from outer face 30 of first wall 22 at second end 28. At least one cover mounting flange 37 extends outwardly from cover flange 34. In one embodiment, cover 18 includes a plurality of cover mounting flanges 37. More specifically, in the exemplary embodiment, cover 18 includes four cover mounting flanges 37.

Can 20 includes a first wall 38 that, in one embodiment, is generally cylindrical. It will be understood that can first wall 38 may be any suitable shape allowing normal operation of motor 10. Can first wall 38 includes a first end 40, a second end 42, an inner face 43 (shown in FIG. 3), and an outer face 44. Can 20 also includes a can flange 46 having a top surface 48. Can flange 46 extends radially outward from outer face 44 of can 20 at second end 42. At least one can mounting flange 50 extends outwardly from can flange 46. In one embodiment, can 20 includes a plurality of can mounting flanges 50. In the exemplary embodiment, can 20 includes four mounting flanges 50.

Cover mounting flanges 37 mate with can mounting flanges 50 to enable can 20 to couple with cover 18. More specifically, because cover flange bottom surface 36 contacts can flange top surface 48, and can mounting flanges 50 are aligned with cover mounting flanges 37, when can mounting flanges 50 are aligned with cover mounting flanges 37, a plurality of cover mounting flange openings 52 are aligned with a plurality of can mounting flange openings 54. In one embodiment, cover mounting flange 37 and can mounting flange 50 each include one opening 52 and 54, respectively. In an alternative embodiment, cover mounting flange 37 and can mounting flange 50 each include a plurality of openings 52 and 54, respectively. Openings 52 and 54 are sized to receive a fastener (not shown) to secure can 20 and cover 18 together.

Cover 18 includes a lead wire opening 56 that is defined by a perimeter 58 and extends between the cover first wall inner face and cover first wall outer face 30. Lead wire opening 56 is adjacent second end 28 of first wall 22, and perimeter 58 includes at least one groove 60. In the exemplary embodiment, perimeter 58 includes a plurality of grooves 60 positioned adjacent one another. Grooves 60 extend outwardly from first wall outer face 30. Each groove 60 is configured to receive a single lead wire 14 therein. In one embodiment, grooves 60 are substantially semi-cylindrically shaped. In one embodiment, grooves 60 are formed on cover 18 using an extrusion process. In an alternative embodiment, grooves 60 are formed on cover 18 through a stamping process. In a further alternative embodiment, grooves 60 are formed on cover 18 through a drawing process. Lead wire opening 56 is configured to receive the lead wires 14, which extend from the motor phase windings through lead wire opening 56. A layer of insulation 62 circumscribes each lead wire 14 to isolate lead wires 14 from each other, water, and any metal surfaces lead wires 14 may contact.

Figure 2:
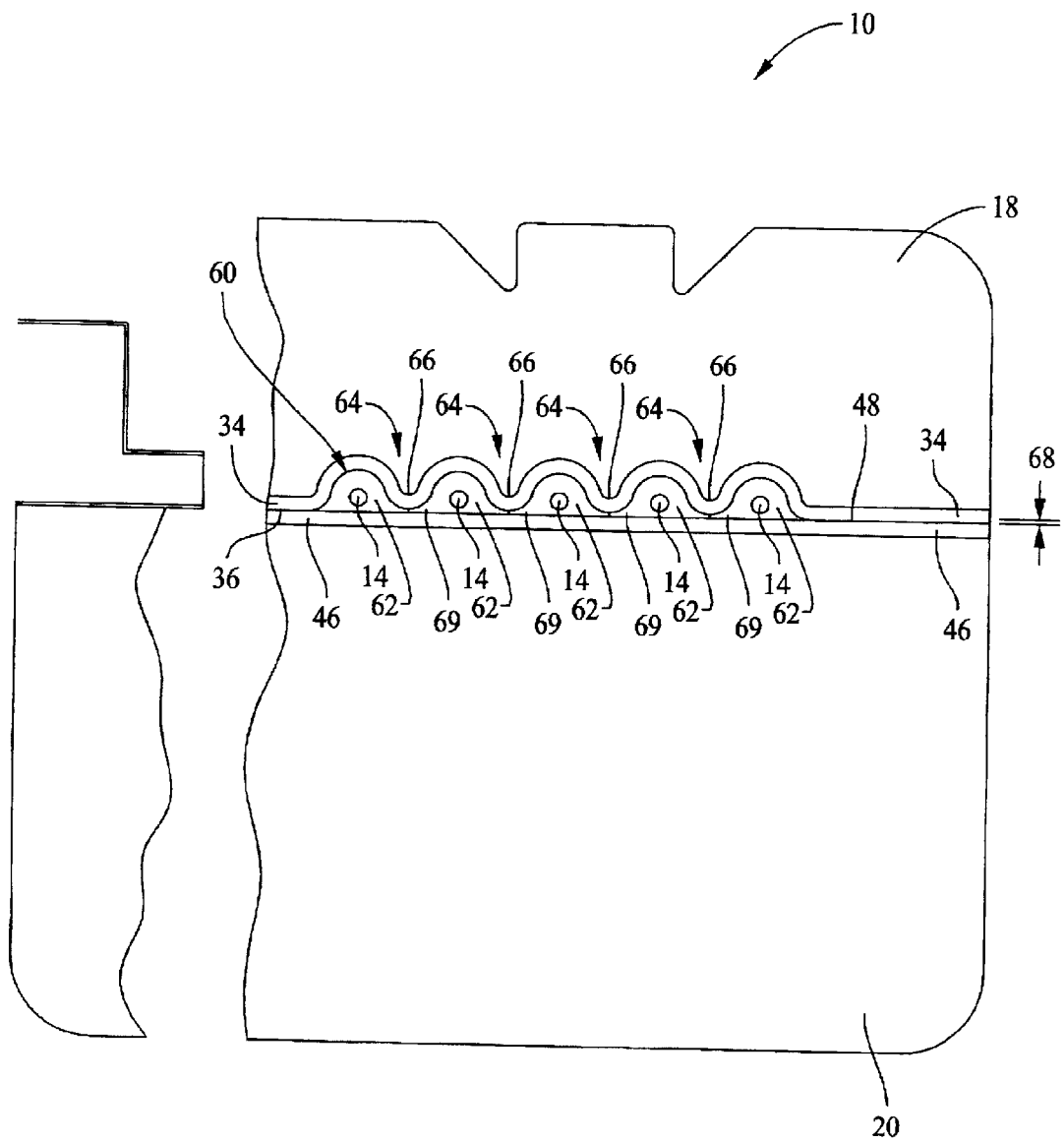
FIG. 2 is a partial front view of the electric motor illustrated in FIG. 1.

FIG. 2 is a partial front view of electric motor 10 and illustrates cover 18 fixedly coupled with can 20. Grooves 60 are formed adjacent one another and are spaced apart by a plurality of troughs 64. Each trough 64 includes an annulus 66 that is spaced a distance 68 from bottom surface 36 of cover flange 34. More specifically, each annulus 66 is spaced distance 68 from top surface 48 of can flange 46. Distance 68 between annuluses 66 and top surface 48 defines a plurality of spaces 69 between annuluses 66 and top surface 48 of can flange 46. Each lead wire 14 is received within a respective groove 60. In the exemplary embodiment, grooves 60 are semi-cylindrically shaped and have an inner radius (not shown) that is approximately equal to, or slightly larger than, an uncompressed radius (not shown) of lead wires 14 including insulation 62.

When cover 18 is fixedly coupled with can 20, lead wire insulation 62 is compressed between cover 18 and can 20. More specifically, insulation 62 is compressed between grooves 60 and can flange 46. As insulation 62 is deformed each lead wire 14 completely fills a respective groove 60. Furthermore, as cover 18 is coupled to can 20, insulation 62 of adjacent lead wires 14 contacts such that insulation 62 substantially fills spaces 69 and forms a substantially watertight seal between grooves 60 and can flange 46. In an alternative embodiment, each annulus 66 is not spaced from top surface 48 of can flange 46, but rather, annuluses 66 mate with top surface 48 of can flange 46 such that a substantially watertight seal is formed between annuluses 66 and top surface 48, and between insulation 62 and top surface 48. Insulation 62 thus facilitates preventing water and other contaminants from entering an internal cavity (not shown) of motor 10 through lead wire opening 56. More specifically, when cover 18 is fixedly coupled with can 20, top surface 48 of can flange 46 mates with bottom surface 36 of cover flange 34 such that top surface 48 and bottom surface 36 form a substantially water tight seal between cover flange 34 and can flange 46.

Figure 3:
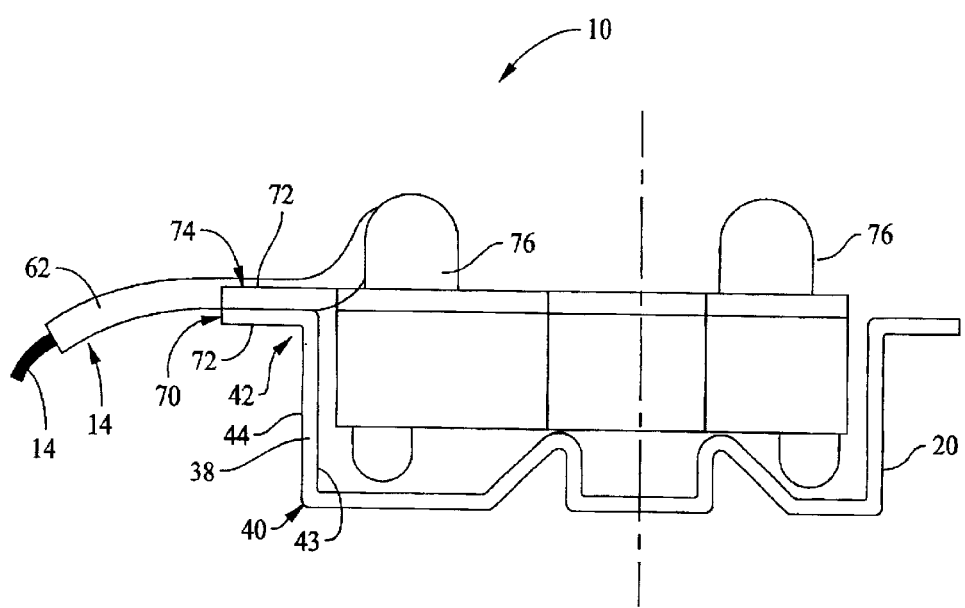
FIG. 3 is a cross-section of an alternative embodiment of an electric motor can of the present invention.

FIG. 3 is cross-section of an alternative embodiment of can 20. Features of motor 10, cover 18, and can 20 illustrated in FIGS. 3 and 4 identical to features of motor 10, cover 18, and can 20 illustrated in FIGS. 1 and 2 are identified in FIGS. 3 and 4 using the same reference numerals as used in FIGS. 1 and 2. Can 20 includes a lead wire opening 70 that is defined by a perimeter 72 and extends between can first wall inner face 43 and can first wall outer face 44. Lead wire opening 70 is adjacent second end 42 of can first wall 38, and perimeter 72 includes at least one groove 74. In the exemplary embodiment, perimeter 72 includes a plurality of grooves 74 positioned adjacent one another. Grooves 74 extend outwardly from first wall outer face 44. Each groove 74 is configured to receive a single lead wire 14 therein. In one embodiment, grooves 74 are substantially semi-cylindrically shaped. In one embodiment, grooves 74 are formed on can 20 using an extrusion process. In an alternative embodiment, grooves 74 are formed on can 20 using a stamping process. In a further alternative embodiment, grooves 74 are formed on can 20 using a drawing process. Lead wire opening 70 is configured to receive lead wires 14, which extend from motor phase windings 76 through lead wire opening 70.

Figure 4:
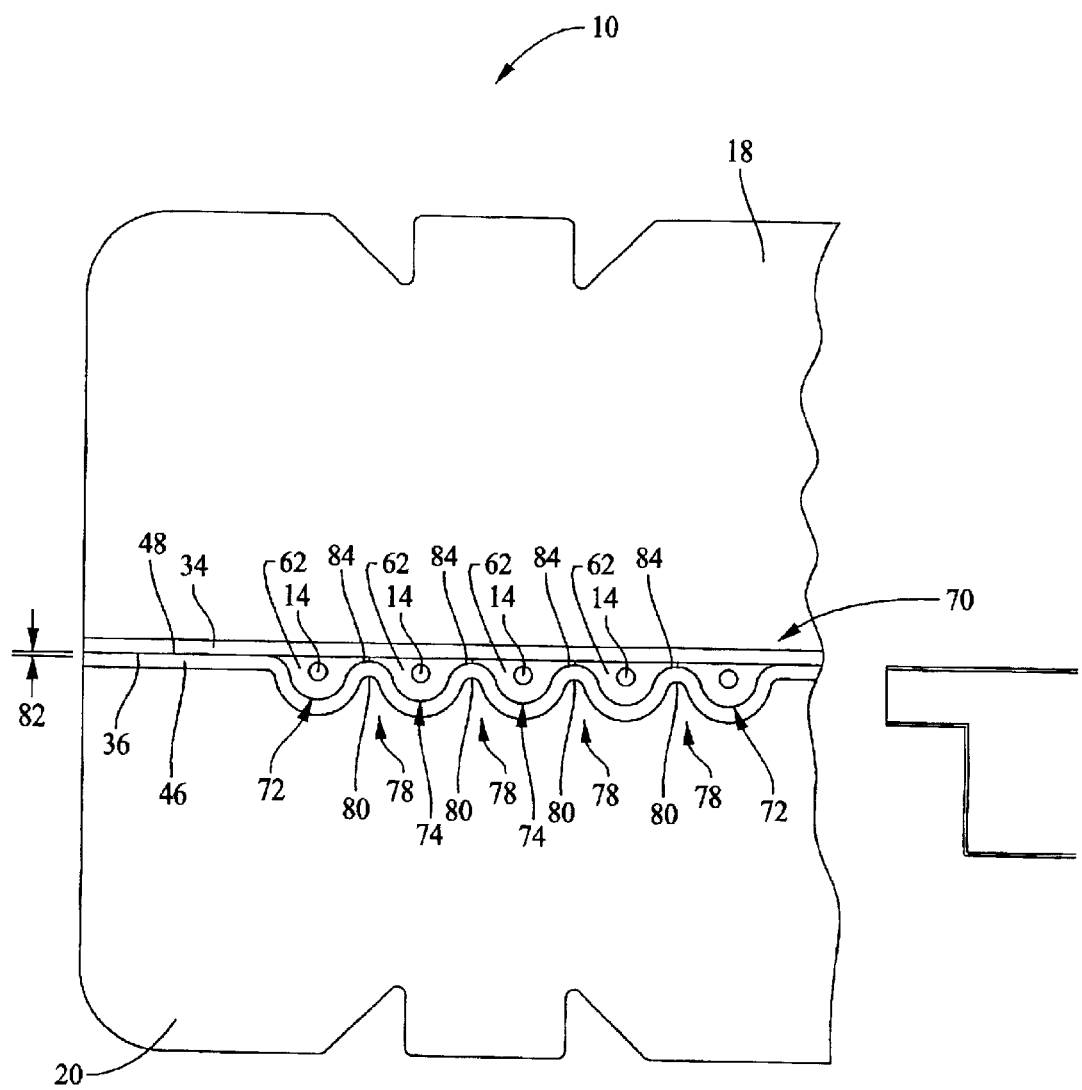
FIG. 4 is a partial front view of an alternative embodiment of the electric motor of the present invention.

FIG. 4 is a partial front view of electric motor 10 and illustrates can 20 including lead wire opening 70, perimeter 72, and grooves 74. FIG. 4 illustrates cover 18 fixedly coupled with can 20. Grooves 74 are formed adjacent one another and are spaced apart by a plurality of troughs 78. Each trough 78 includes a top 80 that is spaced a distance 82 from bottom surface 36 of cover flange 34. More specifically, each top 80 is spaced distance 82 from top surface 48 of can flange 46. Distance 82 between tops 80 and top surface 48 defines a plurality of spaces 84 between tops 80 and top surface 48 of can flange 46. Each lead wire 14 is received within a respective groove 74. In the exemplary embodiment, grooves 74 are semi-cylindrically shaped and have grooves 74 have an inner radius (not shown) that is approximately equal to, or slightly larger than, an uncompressed radius (not shown) of lead wires 14 including insulation 62.

When cover 18 is fixedly coupled with can 20 lead wire insulation 62 is compressed between cover 18 and can 20. More specifically, insulation 62 is compressed between grooves 74 and cover flange 34. As insulation 62 is deformed each lead wire 14 completely fills a respective groove 74. Furthermore, as cover 18 is coupled to can 20, insulation 62 of adjacent lead wires 14 contacts such that insulation 62 substantially fills spaces 84 and forms a substantially watertight seal between grooves 74 and cover flange 34. In an alternative embodiment, each top 80 is not spaced from bottom surface 36 of cover flange 34, but rather, tops 80 mate with bottom surface 36 of cover flange 34 such that a substantially watertight seal is formed between tops 80 and bottom surface 36, and between insulation 62 and bottom surface 36. Insulation 62 thus facilitates preventing water and other contaminants from entering an internal cavity (not shown) of motor 10 through lead wire opening 70. More specifically, when cover 18 is fixedly coupled with can 20, top surface 48 of can flange 46 mates with bottom surface 36 of cover flange 34 such that top surface 48 and bottom surface 36 form a substantially water tight seal between cover flange 34 and can flange 46.

Figure 5:
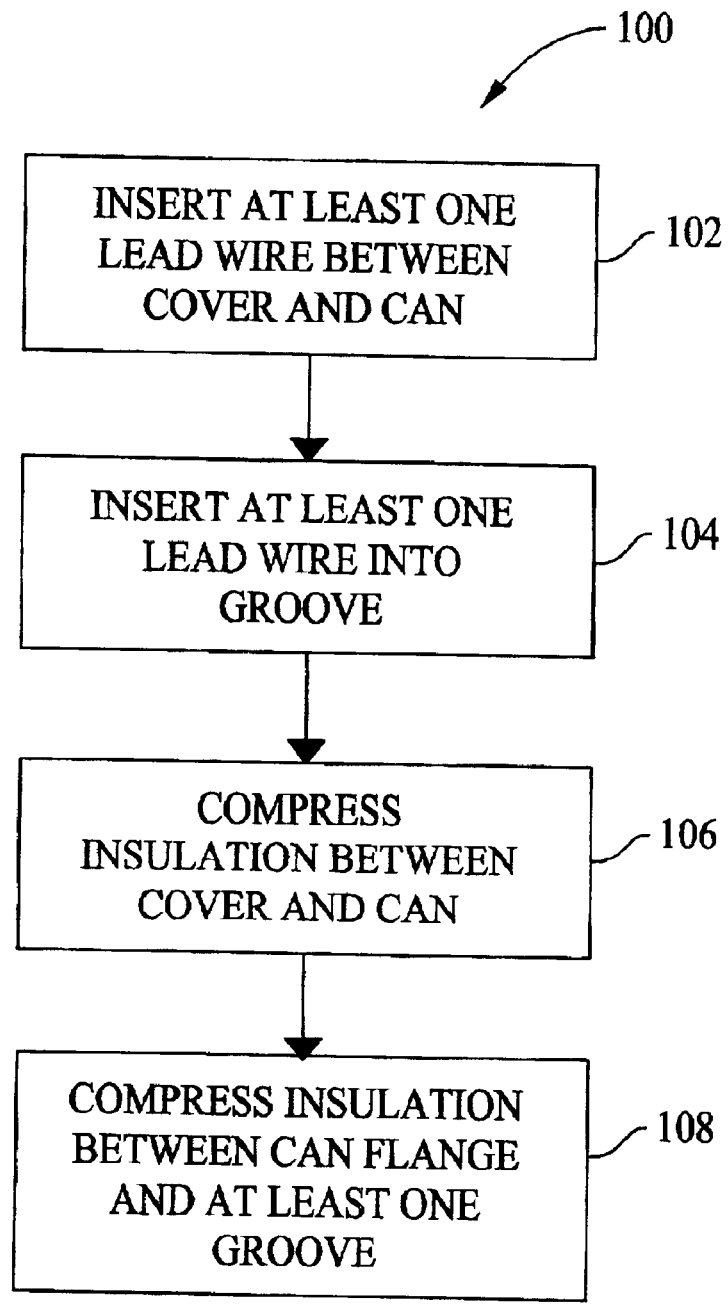
FIG. 5 is a flowchart illustrating one embodiment of a method for insulating an electric motor.

FIG. 5 is a flowchart illustrating one embodiment of a method 100 for insulating electric motor 10 (shown in FIG. 1). Method 100 includes inserting 102 at least one lead wire 14 (shown in FIG. 1) between cover 18 (shown in FIG. 1) and can 20 (shown in FIG. 1), inserting 104 at least one lead wire 14 into at least one groove 60 (shown in FIG. 1), and compressing 106 insulation 62 (shown in FIG. 1) between cover 18 and can 20. Method 100 further includes compressing 108 insulation 62 between can flange 46 (shown in FIG. 1) and at least one groove 60.

Figure 6:
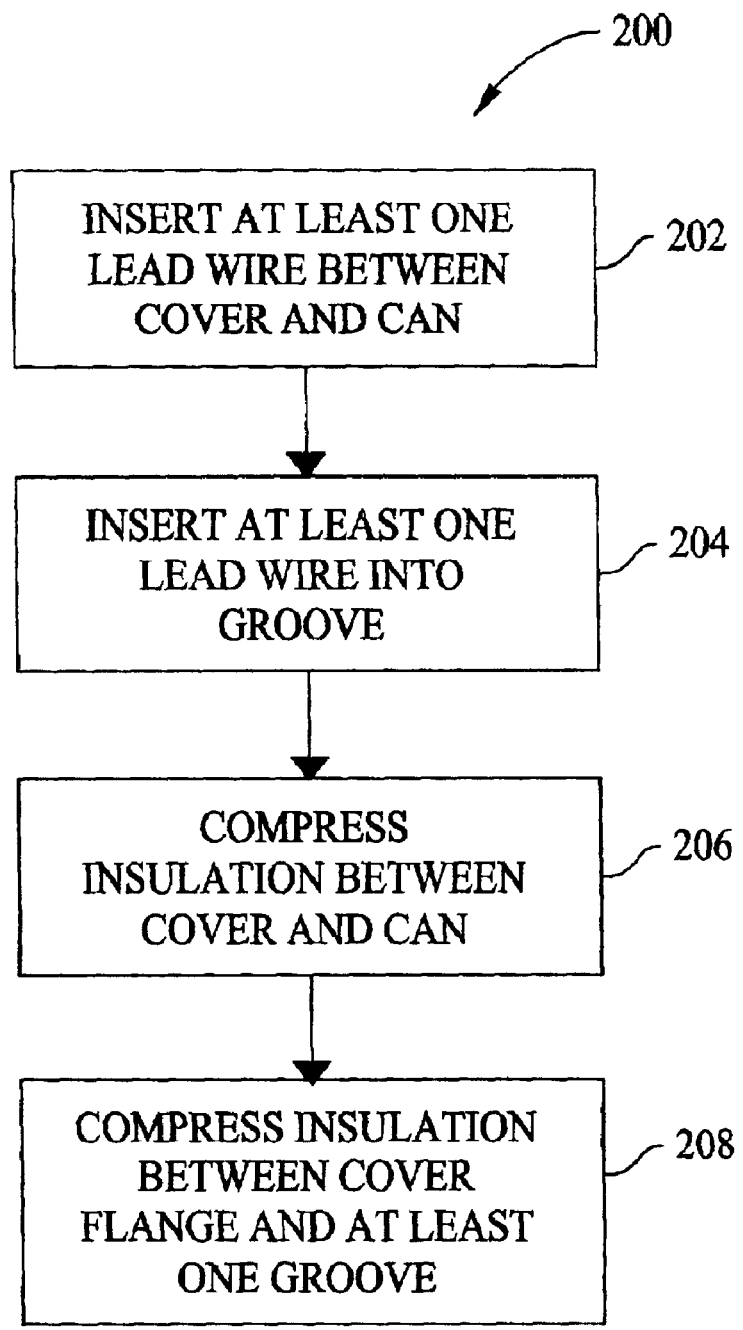
FIG. 6 is a flowchart illustrating one embodiment of a method for insulating an electric motor.

FIG. 6 is a flowchart illustrating one embodiment of a method 200 for insulating electric motor 10 (shown in FIG. 4). Method 200 includes inserting 202 at least one lead wire 14 (shown in FIG. 4) between cover 18 (shown in FIG. 4)

and can 20 (shown in FIG. 4), inserting 204 at least one lead wire 14 into at least one groove 74 (shown in FIG. 4), and compressing 206 insulation 62 (shown in FIG. 4) between cover 18 and can 20. Method 200 further includes compressing 208 insulation 62 between cover flange 34 (shown in FIG. 4) and at least one groove 74.

Although grooves 60 and 74 are herein illustrated and described as being semi-cylindrically shaped, it will be understood that grooves 60 and 74 may be any suitable shape and/or configuration that allows insulation 62 to seal lead wire openings 56 and 70 between cover 18 and can 20 and facilitates sealing the internal cavity of motor 10.

While the invention has been described in terms of various specific embodiments, those skilled in the art will recognize that the invention can be practiced with modification within the spirit and scope of the claims.

What is claimed is:

1. A unitary cover for an electric motor including at least one lead wire and a can, said cover comprising:
   a first wall;
   a flange extending from said first wall; and
   at least one opening defined in part by said flange, said flange configured to contact the at least one lead wire and form a watertight seal therewith.

2. A cover in accordance with claim 1 wherein said flange comprises a perimeter that forms at least one groove defining said opening, said at least one groove is substantially semi-cylindrically shaped.

3. A cover in accordance with claim 2 wherein said at least one opening configured to receive the at least one lead wire therethrough, said at least one groove configured to receive the at least one lead wire therein.

4. A cover in accordance with claim 1 wherein the motor includes a plurality of lead wires, said opening perimeter further comprises a plurality of grooves, said opening configured to receive the plurality of lead wires such that each said groove receives a respective lead wire therein.

5. A cover in accordance with claim 1 wherein said first wall having a first end, a second end, and an outer face, said at least one opening adjacent said second end, said cover further comprises a second wall extending from said first wall first end.

6. A cover in accordance with claim 5 wherein said cover second wall extending substantially perpendicular to said first wall.

7. A cover in accordance with claim 5 wherein the electric motor includes a rotor shaft, said cover second wall comprising a shaft opening configured to receive the rotor shaft.

8. A cover in accordance with claim 5 wherein said at least one groove extends outwardly from said outer face of said first wall.

9. A cover in accordance with claim 5 wherein said cover further comprises at least one mounting flange extending outwardly from said first wall outer face adjacent said first wall second end.

10. A cover in accordance with claim 5 wherein the electric motor also includes a can having a can flange, each respective lead wire includes insulation circumscribing the lead wire, said at least one opening configured to receive the at least one lead wire, said at least one groove configured to receive the at least one lead wire therein such that the insulation is compressed between said at least one groove and the can flange when said cover is fixedly coupled to the can.

11. A cover in accordance with claim 10 wherein the insulation facilitates forming a substantially water-tight seal when compressed.

12. A unitary can for an electric motor including at least one lead wire and a cover, said can comprising:
    a first wall,
    a flange extending from said first wall; and
    at least one opening defined in put by said flange, said flange configured to contact the at least one lead wire and form a watertight seal therewith.

13. A can in accordance with claim 12 wherein said flange comprises a perimeter that forms at least one groove defining said opening, said at least one groove is substantially semi-cylindrically shaped.

14. A can in accordance with claim 13 wherein said at least one opening configured to receive the at least one lead wire therethrough, said at least one groove configured to receive the at least one lead wire therein.

15. A can in accordance with claim 12 wherein the motor includes a plurality of lead wires, said opening perimeter further comprises a plurality of grooves, said opening configured to receive the plurality of lead wires such that each said groove receives a respective lead wire therein.

16. A can in accordance with claim 12 wherein said first wall having a first end, a second end, and an outer face, said at least one opening adjacent said second end.

17. A can in accordance with claim 16 wherein said at least one groove extends outwardly from said outer face of said first wall.

18. A can in accordance with claim 16 wherein said can further comprises at least one mounting flange extending outwardly from said first wall outer face adjacent said first wall second end.

19. A can in accordance with claim 16 wherein the electric motor also includes a cover having a cover flange, each respective lead wire includes insulation circumscribing the lead wire, said at least one opening configured to receive the at least one lead wire, said at least one groove configured to receive the at least one lead wire therein such that the insulation is compressed between said at least one groove and the cover flange when said can is fixedly coupled to the cover.

20. A can in accordance with claim 19 wherein the insulation facilitates forming a substantially water-tight seal when compressed.

21. An electric motor comprising:
    a housing comprising a cover and a can, said cover fixedly coupled to said can, said cover comprising at least one flange, said can comprising at least one flange, and said housing further comprising at least one opening defined by a perimeter comprising at least one groove extending between said at least one cover flange and said at least one can flange;
    a stator comprising at least one winding and a bore therethrough, said stator mounted in said housing;
    at least one lead wire electrically coupled with said at least one winding and configured for electrical connection with an electrical power source, said at least one cover flange and said at learnt one can flange configured to contact said at least one lead wire and form a watertight seal therewith;
    a rotor shaft extending at least partially through said bore and said housing; and
    a rotor core mounted on said rotor shaft, said rotor core comprising at least one magnet.

22. An electric motor in accordance with claim 21 wherein said motor comprises a plurality of lead wires, said opening perimeter further comprises a plurality of grooves, said opening configured to receive the plurality of lead wires such that each said groove receives a respective lead wire therein.

23. An electric motor in accordance with claim 21 wherein said at least one lead wire includes circumscribing surrounding the at least one lead wire, said at least one opening configured to receive said at least one lead wire therethrough, said at least one groove configured to receive said at least one lead wire therein, said insulation compressed between said cover and said can.

24. An electric motor in accordance with claim 23 wherein said at least one groove extends outwardly from said can, said insulation compressed between said cover and said at least one groove.

25. An electric motor in accordance with claim 23 wherein said at least one groove extends outwardly from said cover, said insulation compressed between said can and said at least one groove.

26. An electric motor in accordance with claim 23 wherein said insulation isolates said at least one lead wire from metal surfaces.

27. An electric motor in accordance with claim 23 wherein said insulation seals said at least one lead wire from water and other contaminants.

28. An electric motor in accordance with claim 23 wherein said insulation forms a substantially water tight seal with said at least one groove and said housing such that the insulation facilitates sealing an internal cavity of said motor from water and other contaminants.

29. A method for insulating an electric motor including a cover, a can, and at least one lead wire having insulation surrounding the at least one lead wire, said method comprising:

inserting each respective lead wire between the cover and the can; and compressing the insulation between the cover and the can such that the cover and the can contact the insulation and form a watertight seal therewith.

30. A method in accordance with claim 29 wherein the cover includes at least one opening having a perimeter including at least one groove, said inserting each respective lead wire between the cover and the can comprises inserting each respective lead wire into the at least one groove.

31. A method in accordance with claim 30 wherein the can includes a flange, said compressing the insulation between the cover and the can comprises compressing the insulation between the can flange and the at least one groove.

32. A method in accordance with claim 29 wherein the can includes at least one opening having a perimeter including at least one groove, said inserting each respective lead wire between the cover and the can comprises inserting each respective lead wire into each respective groove.

33. A method in accordance with claim 32 wherein the cover includes a flange, said compressing the insulation between the cover and the can comprises compressing the insulation between the cover flange and the at least one groove.

34. A unitary cover for an electric motor including a can and at least one lead wire having insulation surrounding the at least one lead wire, said cover comprising at least one opening having a perimeter comprising at least one groove, said at least one groove configured to receive said at least one lead wire therein such that when said cover is fixedly attached to the can the insulation is compressed adjacent said at least one groove and the can forming a watertight seal therebetween.

35. A unitary can for an electric motor including a cover and at least one lead wire having insulation surrounding the at least one lead wire, said can comprising at least one opening having a perimeter comprising at least one groove, said at least one groove configured to receive said at least one lead wire therein such that when said can is fixedly attached to the cover the insulation is compressed between adjacent said at least one groove and the cover forming a watertight seal therebetween.

* * * * *

UNITED STATES PATENT AND TRADEMARK OFFICE
CERTIFICATE OF CORRECTION

PATENT NO. : 6,809,445 B2
DATED : October 26, 2004
INVENTOR(S) : Goddam Reddy

It is certified that error appears in the above-identified patent and that said Letters Patent is hereby corrected as shown below:

Column 6,
Line 5, delete "in put" and insert -- in part --.
Line 55, delete "learnt" and insert -- least --.

Column 8,
Line 34, delete "between".

Signed and Sealed this

Second Day of May, 2006

JON W. DUDAS
*Director of the United States Patent and Trademark Office*